(12) United States Patent
Kim et al.

(10) Patent No.: US 8,947,343 B2
(45) Date of Patent: Feb. 3, 2015

(54) LIQUID CRYSTAL DISPLAY CAPABLE OF DETECTING SHORT IN LED IN LIQUID CRYSTAL PANEL AND DRIVING METHOD THEREOF

(75) Inventors: Jungjae Kim, Gyeonggi-do (KR); Soondong Cho, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 136 days.

(21) Appl. No.: 13/550,785

(22) Filed: Jul. 17, 2012

(65) Prior Publication Data

US 2013/0050174 A1    Feb. 28, 2013

(30) Foreign Application Priority Data

Aug. 26, 2011  (KR) .................. 10-2011-0085743

(51) Int. Cl.
*G09G 3/36* (2006.01)
*G09G 3/34* (2006.01)
*H05B 33/08* (2006.01)
*G09G 3/00* (2006.01)

(52) U.S. Cl.
CPC ........ *H05B 33/0887* (2013.01); *G09G 2330/02* (2013.01); *G09G 3/342* (2013.01); *G09G 3/006* (2013.01); *Y02B 20/341* (2013.01); *G09G 2330/12* (2013.01)
USPC ..................................................... 345/102

(58) Field of Classification Search
CPC .......... G09G 3/3406; G09G 2320/064; G09G 2320/0646
USPC .................... 345/102; 349/61–70; 362/561
See application file for complete search history.

(56) References Cited

U.S. PATENT DOCUMENTS

| 7,642,805 B1 | 1/2010 | Yinn et al. |
| 2007/0159736 A1* | 7/2007 | Kajita ............................. 361/18 |
| 2007/0159750 A1* | 7/2007 | Peker et al. .................. 361/93.1 |
| 2007/0188112 A1 | 8/2007 | Kang et al. |
| 2007/0195025 A1* | 8/2007 | Korcharz et al. ............... 345/82 |

(Continued)

FOREIGN PATENT DOCUMENTS

| CN | 102026442 A | 4/2011 |
| KR | 10-2011-0129644 | 12/2011 |

OTHER PUBLICATIONS

Office Action dated Aug. 20, 2012, for corresponding application GB1207256.7.

(Continued)

*Primary Examiner* — Ram Mistry
(74) *Attorney, Agent, or Firm* — Morgan, Lewis & Bockius LLP (57) ABSTRACT

A liquid crystal display comprises: a liquid crystal panel; LED strings connected to an output terminal of a DC power source and providing light to the liquid crystal panel; transistors whose collector electrodes are connected to cathodes of LEDs positioned at the lowermost stages of the LED strings, and whose emitter electrodes are connected to monitor resistors; and an LED driver which has first pins respectively connected to base electrodes of the transistors to supply driving signals and second pins connected between the emitter electrodes of the transistors and monitor resistors, wherein the first pins sense voltages of the base electrodes of the transistors to detect a short in an LED, wherein the LED driver comprises driving signal supply portions for supplying the driving signal and short sensing portions for detecting the presence or absence of a short in the LED.

12 Claims, 10 Drawing Sheets

(56) References Cited

U.S. PATENT DOCUMENTS

| | | | |
|---|---|---|---|
| 2008/0198884 A1* | 8/2008 | Kimura | 372/38.07 |
| 2010/0283773 A1 | 11/2010 | Kim | |
| 2011/0062872 A1 | 3/2011 | Jin et al. | |
| 2012/0119653 A1* | 5/2012 | Bianco et al. | 315/127 |

OTHER PUBLICATIONS

First Notification of Office Action dated Apr. 1, 2014 from The State Intellectual Property Office of China in counterpart application No. 201210167281.0.

* cited by examiner

LIQUID CRYSTAL DISPLAY CAPABLE OF DETECTING SHORT IN LED IN LIQUID CRYSTAL PANEL AND DRIVING METHOD THEREOF

This application claims the benefit of Korean Patent Application No. 10-2011-0085743 filed on Aug. 26, 2011, which is hereby incorporated by reference.

BACKGROUND

1. Field

This document relates to a liquid crystal display and a driving method thereof.

2. Related Art

As the information technology is developed, the market for display devices used as connection mediums between users and information is growing. Accordingly, the use of flat panel displays (FPDs) such as a liquid crystal display (LCD), an organic light emitting diode (OLED) display, and a plasma display panel (PDP) is increasing. Of these, liquid crystal displays are widely used because they have a high resolution and can be big as well as small.

The liquid crystal display comprises a liquid crystal panel comprising a transistor substrate, on which thin film transistors, storage capacitors, pixel electrodes, etc. are formed, a color filter substrate on which color filters, black matrixes, etc. are formed, and a liquid crystal layer positioned between the transistor substrate and the color filter substrate.

When a gate signal is supplied from a gate driver, the liquid crystal layer is driven by a voltage difference between a data voltage supplied from a data driver and a common voltage supplied from a power source, thus causing the liquid crystal display to adjust the amount of light incident from a backlight unit to display an image.

Recently, a light emitting diode (hereinafter, LED) is mainly used as a light source included in the backlight unit. A plurality of LEDs are connected in series in a string to form one unit light source. A plurality of LED strings may be connected in parallel.

Meanwhile, current deviation occurs in a LED string or between LED strings due to impedance difference. Also, a short occurs in an LED because of various causes. If a shorted-LED is detected, overcurrent flows through the corresponding LED string, and the LEDs and a device driving the LEDs are damaged.

Consequently, in the conventional art, an LED driver requiring three pins for each channel was used in order to detect a short and protect the device, and the three pins comprise a first pin for fine-regulating the current of an LED string, a second pin for monitoring the current of the LED string, and a third pin for regulating an output of a DC power source based on the monitored current, and detecting LED short/open.

However, such a structure as the conventional LED driver that requires three pins may have the problem of cost increase due to an increased number of pins in a device configuration. Thus, there arises a demand for a solution that reduces costs.

SUMMARY

Embodiments of the invention provide a liquid crystal display, which can achieve cost reduction by a decrease in the number of pins and prevent overcurrent and lower power consumption.

In one aspect, an exemplary embodiment of the present invention provides a liquid crystal display comprising: a liquid crystal panel; LED strings connected to an output terminal of a DC power source and providing light to the liquid crystal panel; transistors whose collector electrodes are connected to cathodes of LEDs positioned at the lowermost stages of the LED strings, and whose emitter electrodes are connected to monitor resistors; and an LED driver which has first pins respectively connected to base electrodes of the transistors to supply driving signals and second pins connected between the emitter electrodes of the transistors and monitor resistors, wherein the first pins sense voltages of the base electrodes of the transistors to detect a short in an LED, wherein the LED driver comprises driving signal supply portions for supplying the driving signal and short sensing portions for detecting the presence or absence of a short in the LED.

In another aspect, an exemplary embodiment of the present invention provides a driving method of a liquid crystal display, the method comprising: driving a DC power source to boost a first DC power voltage supplied from an external source into a second DC power voltage and supply the same to a backlight unit; driving a transistor for driving the backlight unit to emit light from the backlight unit; and displaying an image on the liquid crystal panel using the light emitted from the backlight unit, wherein, in the step of driving the DC power source, a base electrode of the transistor is monitored, and if a voltage of the base electrode of the transistor drops below a reference voltage, an LED driver driving the transistor is stopped.

BRIEF DESCRIPTION OF THE DRAWINGS

The implementation of this document will be described in detail with reference to the following drawings in which like numerals refer to like elements.

DETAILED DESCRIPTION

Reference will now be made in detail to embodiments, examples of which are illustrated in the accompanying drawings.

Hereinafter, an implementation of this document will be described in detail with reference to the attached drawings.

Figure 1:
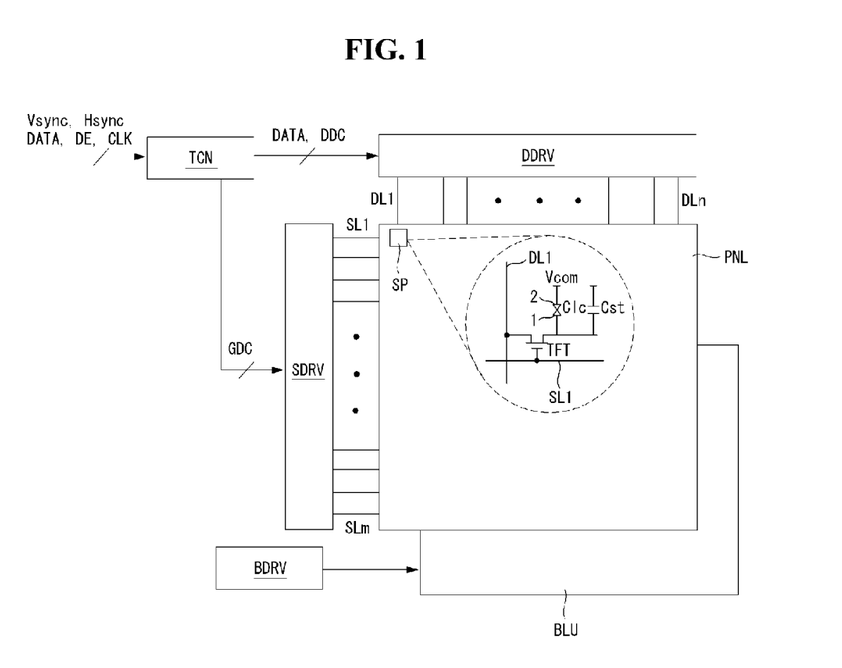
FIG. 1 is a block diagram of a liquid crystal display.
Figure 2:
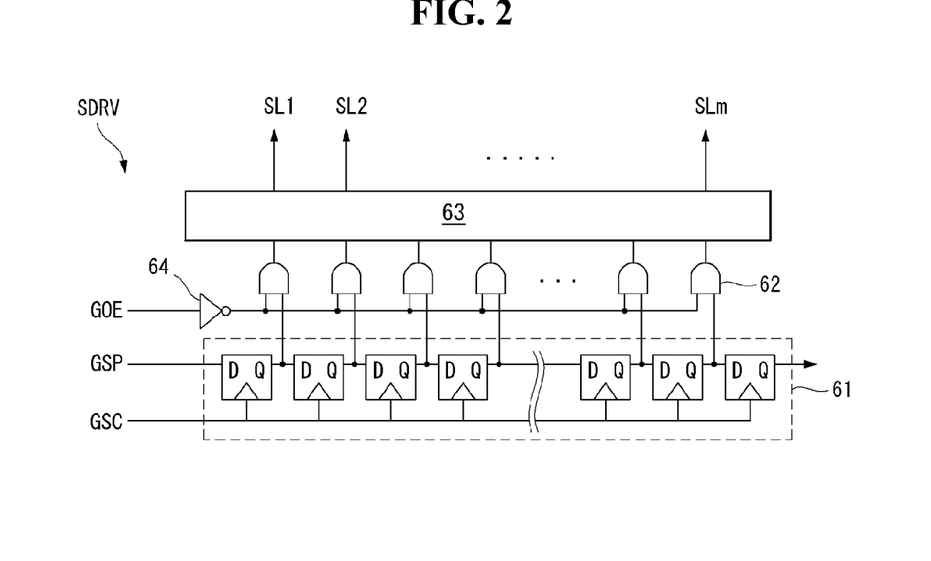
FIG. 2 is a block diagram of a gate driver.
Figure 3:
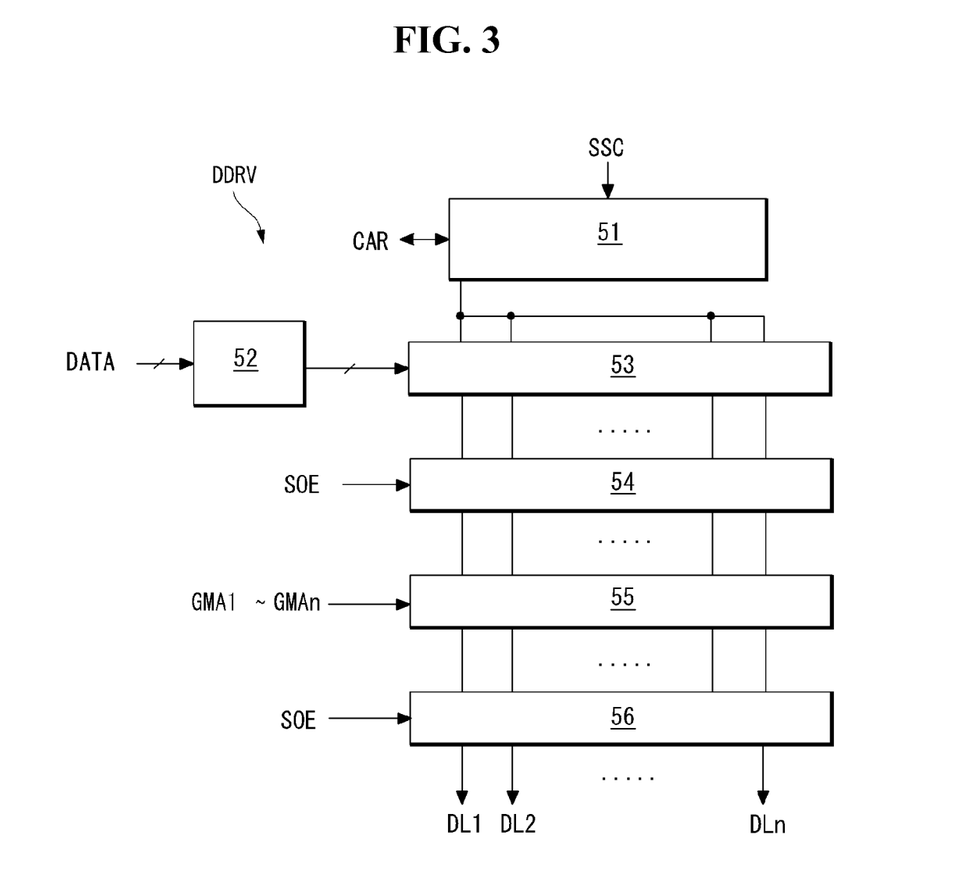
FIG. 3 is a block diagram of a data driver.

FIG. 1 is a block diagram of a liquid crystal display. FIG. 2 is a block diagram of a gate driver. FIG. 3 is a block diagram of a data driver.

As shown in FIG. 1, the liquid crystal display comprises a timing driver TCN, a liquid crystal panel PNL, a gate driver SDRV, a data driver DDRV, a backlight unit BLU, and a backlight unit driver BDRV.

The timing driver TCN receives a vertical synchronous signal Vsync, a horizontal synchronous signal Hsync, a data enable signal DE, a clock signal CLK, and a data signal DATA from an external source. The timing driver TCN controls an operation timing of the data driver DDRV and an operation timing of the gate driver SDRV using timing signals such as the vertical synchronous signal Vsync, the horizontal synchronous signal Hsync, the data enable signal DE, and the clock signal CLK.

In this case, because the timing driver TCN can determine a frame period by counting the data enable signal DE during one horizontal period, the vertical synchronous signal Vsync and the horizontal synchronous signal Hsync may be omitted. The timing driver TCN generates control signals GDC and DDC for controlling a panel driver driving the liquid crystal panel PNL, together with the gate driver SDRV and the data driver DDRV. The control signals GDC and DDC may include a gate timing control signal GDC for controlling the operation timing of the gate driver SDRV and a data timing control signal DDC for controlling the operation timing of the data driver DDRV.

The liquid crystal panel PNL comprises a thin film transistor (hereinafter, abbreviated as TFT) substrate, a color filter substrate, a liquid crystal layer between the TFT substrate and the color filter substrate, and a plurality of subpixels arranged in a matrix form. Data lines, gate lines, TFTs, storage capacitors, and the like are formed on the TFT substrate. A black matrix, a color filter, and the like are formed on the color filter substrate.

One subpixel SP is defined by the data line DL 1 and the gate line SL1 crossing each other. Each of the plurality of subpixels SP comprises the TFT driven by the gate signal supplied through the gate line SL1, the storage capacitor Cst for storing the data signal RGB supplied through the data line DL1, and a liquid crystal cell Clc.

The liquid crystal cell Clc is driven by the data voltage supplied to a pixel electrode 1 and a common voltage Vcom supplied to a common electrode 2. In a vertical electric field drive manner such as a twisted nematic (TN) mode and a vertical alignment (VA) mode, the common electrode 2 is formed on the color filter substrate. In a horizontal electric field drive manner such as an in-plane switching (IPS) mode and a fringe field switching (FFS) mode, the common electrode 2 is formed on the TFT substrate along with the pixel electrode 1. Polarizing plates are respectively attached to the TFT substrate and the color filter substrate of the liquid crystal panel PNL. Alignment layers for setting a pre-tilt angle of liquid crystals are respectively formed on the TFT substrate and the color filter substrate. The liquid crystal panel PNL applicable to the embodiment of the invention may be implemented in any liquid crystal mode as well as the TN, VA, IPS, and FFS modes.

The gate driver SDRV sequentially generates a gate signal in response to the gate timing control signal GDC received from the timing driver TCN. The gate driver SDRV supplies the gate signal through gate lines SL1 to SLm to the subpixels SP of the liquid crystal panel PNL.

As shown in FIG. 2, the gate driver SDRV comprises a plurality of gate driver ICs. Each of the plurality of gate driver ICs comprises a shift register 61, a level shifter 63, a plurality of AND gates 62 connected between the shift register 61 and the level shifter 63, an inverter 64 for inverting the gate output enable signal GOE, and the like. The shift register 61 sequentially shifts the gate start pulse GSP in response to the gate shift clock GSC using a plurality of cascade-connected D-flip flops. Each of the AND gates 62 performs an AND operation on an output signal of the shift register 61 and an inversion signal of the gate output enable signal GOE to generate an output. The inverter 64 inverts the gate output enable signal GOE and supplies the inverted signal of the gate output enable signal GOE to the AND gates 62. The level shifter 63 shifts a swing width of an output voltage of the AND gates 62 to the swing width of the gate voltage capable of operating the transistors of the liquid crystal panel PNL. The gate signal output from the level shifter 63 is sequentially supplied to the gate lines SL1 to SLm. Moreover, the gate driver SDRV may be formed on the panel in a Gate-In Panel scheme.

The data driver DDRV samples and latches the data signal RGB received from the timing driver TCN in response to the data timing control signal DDC received from the timing driver TCN and converts the latched data signal DATA into parallel data. When the data driver DDRV converts the data signal DATA into the parallel data, the data driver DDRV converts the data signal DATA based on a gamma reference voltage. The data driver DDRV supplies the converted data signal DATA to the subpixels SP of the liquid crystal panel PNL through data lines DL1 to DLn.

As shown in FIG. 3, the data driver DDRV comprises a shift register 51, a data register 52, a first latch 53, a second latch 54, a converter 55, an output circuit 56, and the like. The shift register 51 shifts the source sampling clock SSC received from the timing driver TCN. For example, the shift register 51 of one data driver IC transfers a carry signal CAR to the shift register 51 of a next data driver IC. The data register 52 temporarily stores the data signal DATA received from the timing driver TCN and supplies it to the first latch 53. The first latch 53 samples and latches the serially input data signal DATA in response to a clock sequentially received from the shift register 51. The first latch 53 then simultaneously outputs the latched data signal DATA. The second latch 54 latches the data received from the first latch 53 and then simultaneously outputs the latched data in synchronization with second latches 54 of other source drives ICs in response to the source output enable signal SOE. The converter 55 converts the data signal DATA received from the second latch 54 based on gamma reference voltages GMA1 to GMAn. The data signal DATA output from the output circuit 56 is supplied to the data lines DL1 to DLn in response to the source output enable signal SOE.

The backlight unit BLU provides light to the liquid crystal panel PNL. The backlight unit BLU may be configured as an edge type, a dual type, a direct type, etc. The edge type is a string of light emitting diodes arranged on one side of the liquid crystal panel PNL. The dual type is a string of light emitting diodes arranged on both sides of the liquid crystal panel PNL. The direct type is a block or matrix of light emitting diodes arranged under the liquid crystal panel PNL.

The backlight unit driver BDRV drives the backlight unit BLU. The backlight unit driver BDRV comprises a DC power source for supplying DC power to LED strings, transistors for driving the LED strings, and LED drivers for driving the transistors and controlling the DC power source. If a short occurs in the LED strings, the backlight unit BDRV can detect the short and protect the devices from being shorted. This will be described in more detail below.

<First Exemplary Embodiment>

Figure 4:
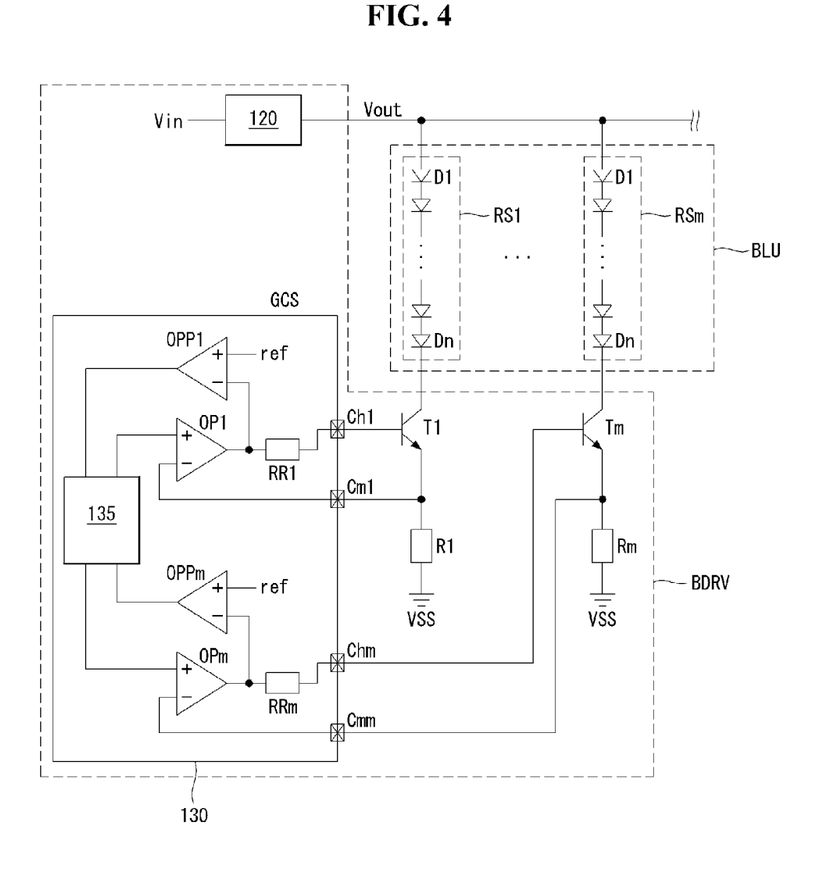
FIG. 4 is a view showing the configuration of a backlight unit driver of a liquid crystal display according to a first exemplary embodiment of the present invention.
Figure 5:
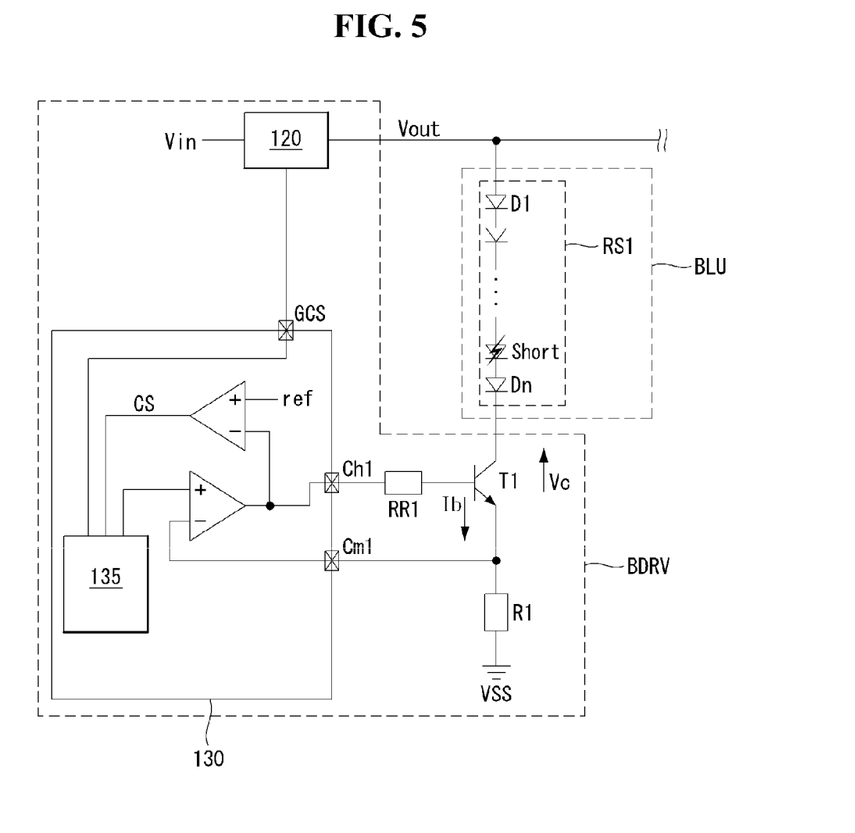
FIG. 5 is a view for explaining the operation of the backlight unit driver of FIG. 4.
Figure 6:
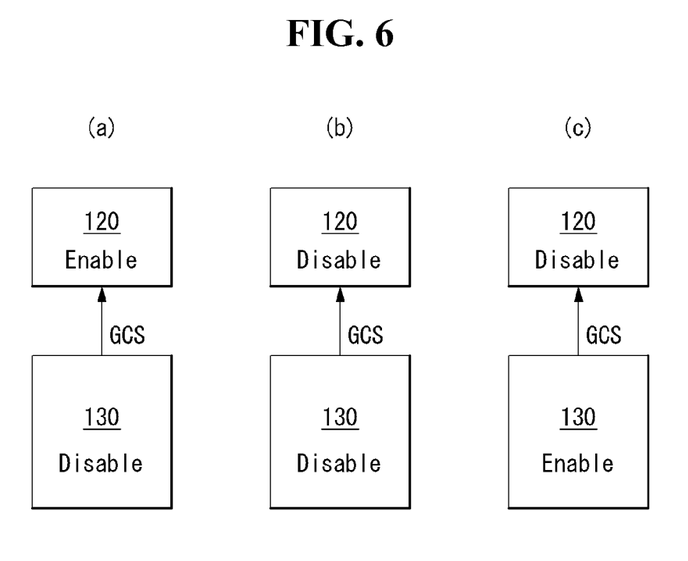
FIG. 6 is a view showing the operating state of a DC power source and an LED driver in the event of LED short.

FIG. 4 is a view showing the configuration of a backlight unit driver of a liquid crystal display according to a first exemplary embodiment of the present invention. FIG. 5 is a view for explaining the operation of the backlight unit driver of FIG. 4. FIG. 6 is a view showing the operating state of a DC power source and an LED driver in the event of LED short.

As shown in FIG. 4, the liquid crystal display according to the first exemplary embodiment of the present invention comprises a backlight unit BLU providing light and a backlight unit driver BDRV driving the backlight unit BLU.

The backlight unit driver BLU comprises LED strings RS1 to RSm. The LED strings RS1 to RSm comprise a first LED string RS1 and an m-th LED string RSm connected in parallel to an output terminal Vout of a DC power source 120. The LEDs D1 to Dn included in each of the LED strings RS1 to RSm are connected in series in the corresponding LED string. Anodes of the first LEDs D1 included in the LED strings RS1 to RSm are connected to the output terminal Vout of the DC power source 120, and cathodes of the n-th LEDs Dn are respectively connected to collector electrodes of the transistors T1 and Tm.

The backlight unit BDRV comprises the DC power source 120, the transistors T1 and Tm, monitor resistors R1 and Rm, and an LED driver 130.

The DC power source 120 converts a first DC power input through an input terminal Vin into a second DC power and outputs it through an output terminal Vout. The DC power source 120 may be a typical DC-to-DC converter, which comprises an inductor, a transistor, a diode, and a capacitor. As the transistor boosts an input power voltage based on a power control signal GCS supplied from the LED driver 130, the DC power source 120 outputs power after boosting the voltage.

The transistors T1 and Tm are driven by a driving signal supplied from the LED driver 130, and sink the current flowing through the corresponding LED string to a ground voltage source VSS to cause the corresponding LED string to emit light. The collector electrodes of the transistors T1 and Tm are respectively connected to the cathodes of the n-th LEDs Dn included in the LED strings RS1 to RSm, base electrodes of the transistors T1 and Tm are respectively connected to the first pins Ch1 and Chm of the LED driver 130, and emitter electrodes of the transistors T1 and Tm are respectively connected to the monitor resistors R1 and Rm. In the case that the transistors T1 and Tm are FETs, their electrodes are named a source electrode, a drain electrode, and a gate electrode, respectively. On the other hand, in the case that the transistors T1 and Tm are BJTs, their electrodes are named an emitter electrode, a collector electrode, and a base electrode.

The monitor resistors R1 and Rm assist in monitoring current so that the LED driver 130 can regulate an output voltage of the DC power source 120 using the current flowing through the transistors T1 and Tm. One ends of the monitor resistors R1 and Rm are connected to the emitter electrodes of the transistors T1 and Tm and the second pins Cm1 and Cmm of the LeD driver 130, and the other ends of the monitor resistors R1 and Rm are connected to a ground voltage source VSS.

The LED driver 130 drives the transistors T1 and Tm using a driving signal. Moreover, the LED driver 130, senses voltages of the base electrodes of the transistors T1 and Tm to detect a short in the LEDs, and regulates the output voltage of the DC power source 120 using monitored currents supplied from the monitor resistors R1 and Rm. The LED driver 130 comprises M (M is an integer more than 1) first pins Ch1 and Chm for driving and sensing the base electrodes of M transistors T1 and Tm and M second pins Cm1 and Cmm that receive the monitor currents from M monitor resistors R1 and Rm.

The LED driver 130 comprises driving signal supply portions OP1 and OPm for supplying a driving signal, short sensing portions OPP1 and OPPm for detecting a short in the LEDs, and a controller 135 for generating a driving signal and controlling the DC power source 120. The number of the driving signal supply portions OP1 and OPm and the number of short sensing portions OPP1 and OPPm correspond to the number of the M first pins Ch1 and Chm, respectively.

The controller 135 generates the power control signal GCS for regulating the output voltage of the DC power source 120 and a driving signal to be supplied to the driving signal supply portions OP1 and OPm. The power control signal GCS and the driving signal may comprise, but not limited to, a pulse width modulation signal.

The driving signal supply portions OP1 and OPm supply the driving signal supplied from the controller 135 to the base electrodes of the transistors T1 and Tm. The driving signal supply portions OP1 and OPm comprise first comparators OP1 and OPm. The first comparators OP1 and OPm are configured such that their output terminals are respectively connected to one ends of sensing resistors RR1 and RRm connected to the first pins Ch1 and Chm, and their inverting terminals (−) are connected to the second pins Cm1 and Cmm, and their non-inverting terminals (+) are connected to the controller 135. The driving signal supply portions OP1 and OPm monitor the current of their corresponding LED string through the second pins Cm1 and Cmm, and control the driving signal output from the first pins Ch1 and Chm.

The short sensing portions OPP1 and OPPm receive a sensing voltage from the base electrodes of the transistors T1 and Tm, respectively, through the sensing resistors RR1 and RRm respectively formed between output terminals of the driving signal supply portions OP1 and OPm and the base electrodes of the transistors T1 and Tm, and detect the presence or absence of a short in the LEDs included in their LED string based on the sensing voltage. The sensing resistors RR1 and RRm are formed inside the LED driver 130 so as to be respectively positioned between the output terminals of the driving signal supply portions OP1 and OPm and the first pins Ch1 and Chm. Alternatively, the sensing resistors RR1 and RRm may be formed outside the LED driver 130 so as to be respectively positioned between the first pins Ch1 and Chm and the base electrodes of the transistors T1 and Tm.

The short sensing portions OPP1 and OPPm comprise comparators OPP1 and OPPm whose inverting terminal (−) is connected to a node connecting the output terminals of the driving signal supply portions OP1 and OPm to one ends of the sensing resistors RR1 and RRm, and whose non-inverting terminals (+) is connected to a reference voltage terminal supplying a reference voltage (ref).

By this configuration, the short sensing portions OPP1 and OPPm detect the presence or absence of a short in the LEDs included in their corresponding LED string by using a difference between a sensing voltage and a reference voltage (ref). Accordingly, the reference voltage (ref) may be set based on the sensing voltage. Also, the controller 135 should be designed not to regard a slightly significant difference in sensing voltages as a short. To this end, the controller 135 may use a look-up table that stores a data table for each sensing voltage to determine the presence or absence of an LED short according to a condition defined for each significant difference in sensing voltages. Here, the look-up table may be an internal or external memory of the LED driver 130.

As shown in FIG. 5, the operation of the backlight unit driver BDRV will be described below with respect to an example in which a short occurs in the first LED string RS1.

If a short occurs in the first LED string RS1, a collector electrode voltage Vc of the first transistor T1 rises but the base electrode current Ib of the first transistor T1 drops. The first short sensing portion OPP1 senses the base electrode voltage Ve of the first transistor T1 through the first sensing resistor RR1 formed outside the LED driver 130.

As the base electrode voltage of the first transistor T1 drops below the reference voltage (ref), the first short sensing portion OPP1 supplies a detection value CS indicating the occurrence of a short in an LED of the first LED string RS1 to the controller 135. Then, as shown in FIG. 6, the controller 135 disables one or both of the LED driver 130 and the DC power source 120 based on the detection value CS supplied from the first short sensing portion OPP1.

Such a phenomenon occurs owing to the characteristic of the first transistor T1: if the voltage Vce between a collector electrode and a emitter electrode increases when the current of the collector electrode is constant, the current Ib of the base electrode decreases (DC gain increase). By forming the sensing resistor RR1 in series with the base electrode of the first transistor T1 using this characteristic, a decreased current value can be sensed by a voltage, and the presence or absence of a short in the corresponding LED string can be detected based on the sensed current decrease.

As shown in FIG. 6(*a*), if a short occurs in the first LED string RS1, the controller 135 can control such that the DC power source 120 is enabled and the LED driver 130 is disabled.

As shown in FIG. 6(*b*), if a short occurs in the first LED string RS1, the controller 135 can control such that the DC power source 120 and the LED driver 130 are disabled.

As shown in FIG. 6(*c*), if a short occurs in the first LED string RS1, the controller 135 can control such that the DC power source 120 is disabled and the LED driver 130 is enabled.

As shown in FIGS. 6(*a*) to 6(*c*), if a short occurs in an LED of an LED string connected to a specific channel, the LED driver 130 disables the channel with the short or disables all the channels. Also, if a short occurs in an LED of an LED string connected to a specific channel, the LED driver 130 stops the output of the DC power source 120.

As described above, if a short occurs in an LED, the transistors T1 and Tm are also disabled because the LED driver 130 is disabled. Moreover, if a short occurs in an LED, the DC power source 120 as well is disabled, thereby preventing the problem of damage to the devices of the backlight unit driver due to overcurrent. Further, the transistors can be driven by monitoring the current flowing through the corresponding LED string by two pins, which is less than the number of pins of the conventional LED driver by 1, and therefore cost reduction resulting from a decrease in the number of pins in a device configuration can be achieved.

<Second Exemplary Embodiment>

Figure 7:
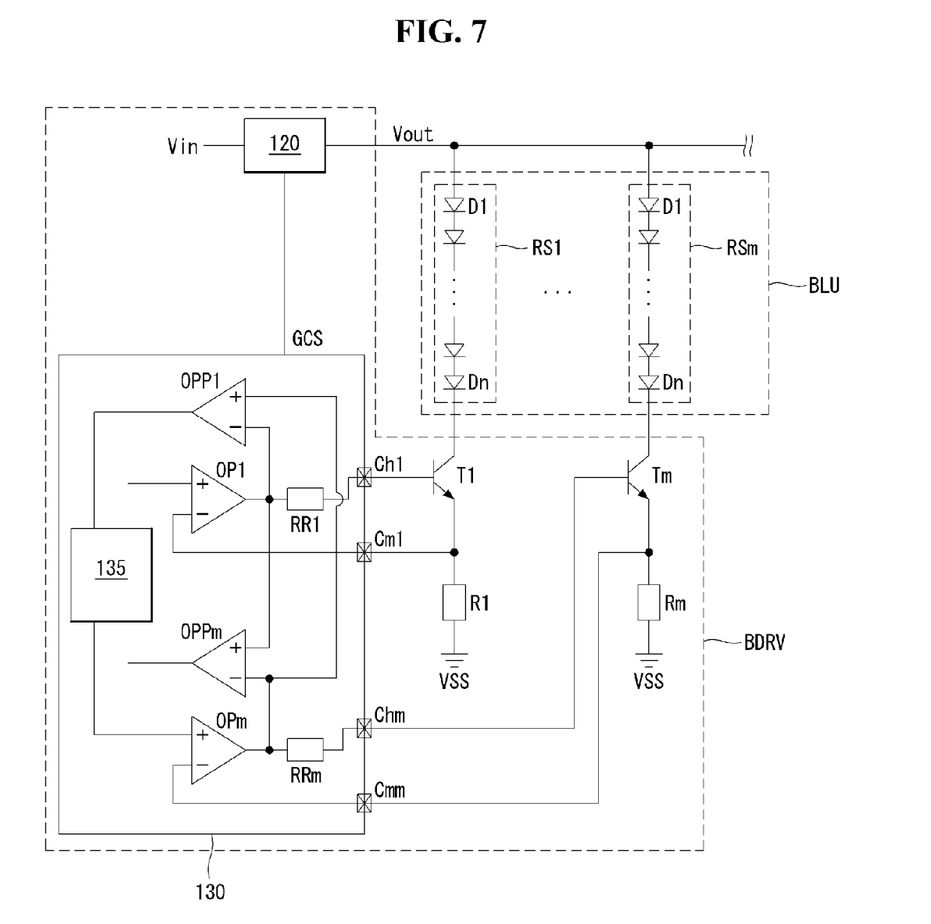
FIG. 7 is a view showing the configuration of a backlight unit of a liquid crystal display according to a second exemplary embodiment of the present invention.

FIG. 7 is a view showing the configuration of a backlight unit of a liquid crystal display according to a second exemplary embodiment of the present invention.

As shown in FIG. 7, the liquid crystal display according to the second exemplary embodiment of the present invention comprises a backlight unit BLU providing light and a backlight unit driver BDRV driving the backlight unit BLU.

Although the configuration of the second exemplary embodiment of the present invention is similar to that of the first exemplary embodiment of the present invention, the description will be made on the differences in the short sensing portions OPP1 and OPPm of the LED driver 130 of the backlight unit driver BDRV.

The short sensing portions OPP1 and OPPm receive a sensing voltage from the base electrodes of the transistors T1 and Tm, respectively, via the sensing resistors RR1 and RRm respectively formed between output terminals of the driving signal supply portions OP1 and OPm and the base electrodes of the transistors T1 and Tm, and detect a short in the LEDs included in their LED string based on the sensing voltage. The sensing resistors RR1 and RRm are formed inside the LED driver 130 so that they are respectively positioned between the output terminals of the driving signal supply portions OP1 and OPm and the first pins Ch1 and Chm. Alternatively, the sensing resistors RR1 and RRm may be formed outside the LED driver 130 so that they are respectively positioned between the first pins Ch1 and Chm and the base electrodes of the transistors T1 and Tm.

The short sensing portions OPP1 and OPPm detect a short in the LEDs included in their corresponding LED string by using a difference between an (N−1)-th (N is an integer more than 1) sensing voltage supplied from an (N−1)-th first pin and an N-th sensing voltage supplied from an N-th first pin.

For example, the first short sensing portion OPP1 comprises a comparator OPP1 whose inverting terminal (−) is connected to an output terminal of an (N−1)-th driving signal supply portion OP1 supplying a driving signal to the (N−1)-th first pin Ch1, and whose non-inverting terminal (+) is connected to an output terminal of an N-th driving signal supply portion OPm supplying a driving signal to the N-th first pin Chm. The m-th short sensing portion OPPm comprises a comparator OPPm whose inverting terminal (−) is connected to the output terminal of the N-th driving signal supply portion OPm supplying a driving signal to the N-th first pin Chm, and whose non-inverting terminal (+) is connected to the output terminal of the (N−1)-th driving signal supply portion OP1 supplying a driving signal to the (N−1)-th first pin Ch1.

By configuring the short sensing portions OPP1 and OPPm as above, they can detect the presence or absence of a short in a corresponding LED string by comparing the sensing voltages sensed from neighboring first pins Ch1 and Chm with each other. That is, in the second exemplary embodiment, unlike the first exemplary embodiment in which the presence or absence of a short in a corresponding LED string is detected by comparing a sensing voltage with a reference voltage, the presence or absence of a short in a corresponding LED string is detected by using the sensing voltage sensed from the neighboring first pins Ch1 and Chm as reference voltages, and comparing them with each other.

<Third Exemplary Embodiment>

Figure 8:
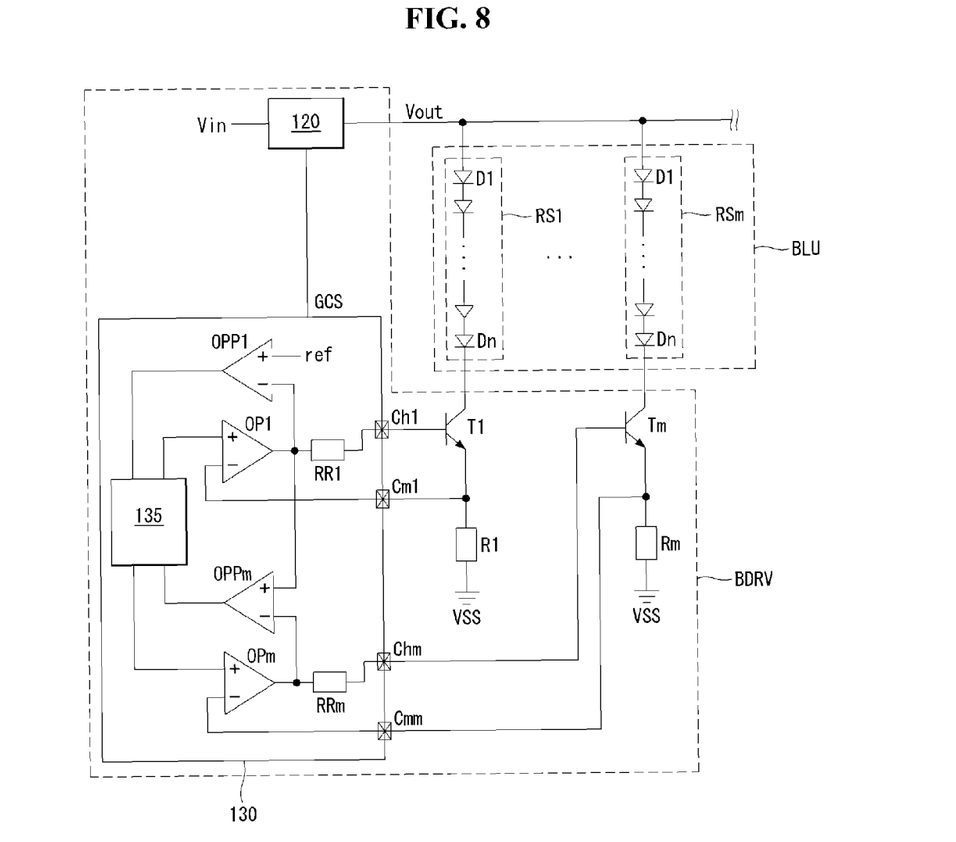
FIG. 8 is a view showing the configuration of a backlight unit of a liquid crystal display according to a third exemplary embodiment of the present invention.

FIG. 8 is a view showing the configuration of a backlight unit of a liquid crystal display according to a third exemplary embodiment of the present invention.

As shown in FIG. 8, the liquid crystal display according to the third exemplary embodiment of the present invention comprises a backlight unit BLU providing light and a backlight unit driver BDRV driving the backlight unit BLU.

Although the configuration of the third exemplary embodiment of the present invention is similar to that of the second exemplary embodiment of the present invention, the description will be made on the differences in the short sensing portions OPP1 and OPPm of the LED driver 130 of the backlight unit driver BDRV.

The short sensing portions OPP1 and OPPm receive a sensing voltage from the base electrodes of the transistors T1 and Tm, respectively, via the sensing resistors RR1 and RRm respectively formed between output terminals of the driving signal supply portions OP1 and OPm and the base electrodes of the transistors T1 and Tm, and detect a short in the LEDs included in their LED string based on the sensing voltage. The sensing resistors RR1 and RRm are formed inside the LED driver 130 so that they are respectively positioned between the output terminals of the driving signal supply portions OP1 and OPm and the first pins Ch1 and Chm. Alternatively, the sensing resistors RR1 and RRm may be formed outside the LED driver 130 so that they are respectively positioned between the first pins Ch1 and Chm and the base electrodes of the transistors T1 and Tm.

One of the short sensing portions OPP1 and OPPm detects a short in the LEDs included in the corresponding LED string by using a difference between an (N−1)-th (N is an integer more than 1) sensing voltage supplied from (N−1)-th first pin and a reference voltage. Meanwhile, the other one of the short sensing portions OPP1 and OPPm detects the presence or absence of a short in the LEDs included in the corresponding LED string by using a difference between an (N−1)-th sensing voltage supplied from an (N−1)-th first pin and an N-th sensing voltage supplied from an N-th first pin.

For example, the first short sensing portion OPP1 comprises a comparator OPP1 whose inverting terminal (−) is connected to an output terminal of an (N−1)-th driving signal supply portion OP1 supplying a driving signal to the (N−1)-th first pin Ch1, and whose non-inverting terminal (+) is connected to a reference voltage terminal supplying a reference voltage (ref). The m-th short sensing portion OPPm comprises a comparator OPPm whose inverting terminal (−) is connected to the output terminal of the N-th driving signal supply portion OPm supplying a driving signal to the N-th first pin Chm, and whose non-inverting terminal (+) is connected to the output terminal of the (N−1)-th driving signal supply portion OP1 supplying a driving signal to the (N−1)-th first pin Ch1.

By configuring the short sensing portions OPP1 and OPPm as above, one of them can detect the presence or absence of a short in a corresponding LED string by comparing a sensing voltage with a reference voltage (ref). Meanwhile, the other one can detect the presence or absence of a short in a corresponding LED string by comparing the sensing voltages sensed from neighboring first pins Ch1 and Chm with each other. That is, the third exemplary embodiment is a combination of the first exemplary embodiment in which the presence or absence of a short in a corresponding LED string is detected by comparing a sensing voltage with a reference voltage and the second exemplary embodiment in which the presence or absence of a short in a corresponding LED string is detected by comparing neighboring sensing voltages.

Hereinafter, a driving method of a liquid crystal display according to a fourth exemplary embodiment of the present invention will be described.

<Fourth Exemplary Embodiment>

Figure 9:
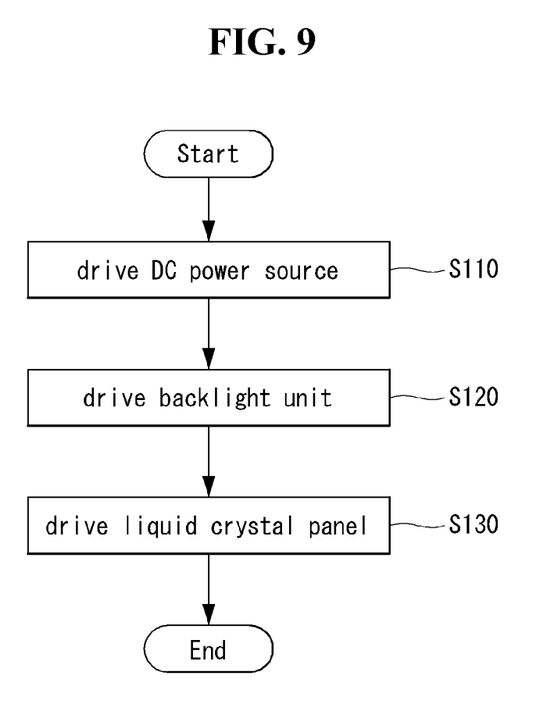
FIG. 9 is a flowchart showing a schematic driving method of a liquid crystal display according to a fourth exemplary embodiment of the present invention.
Figure 10:
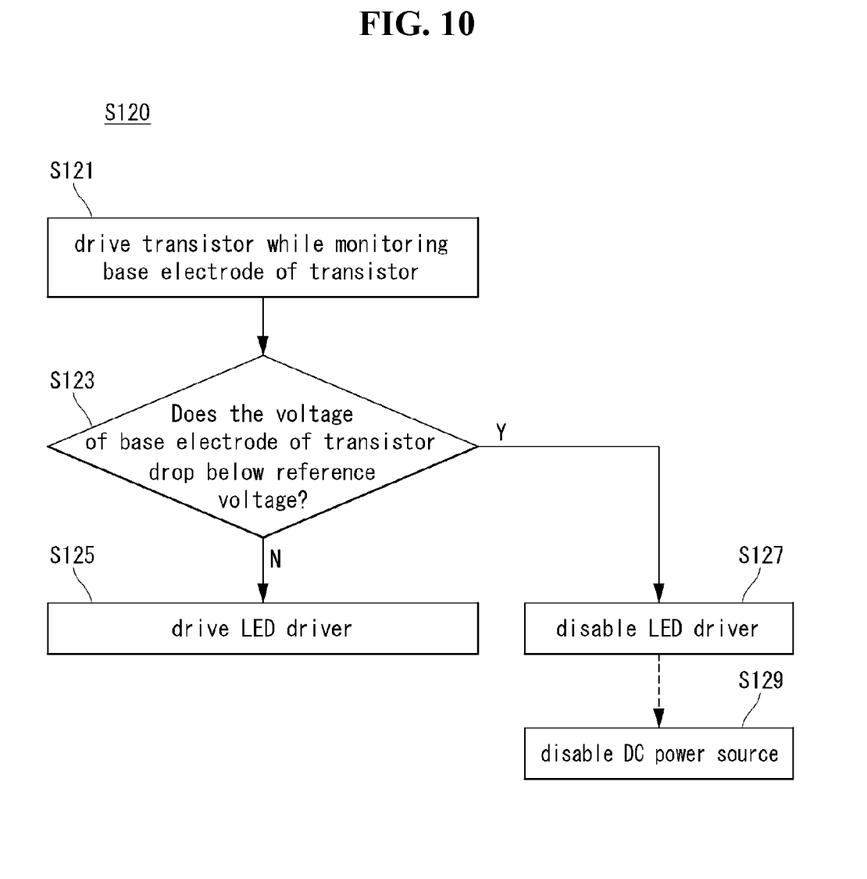
FIG. 10 is a detailed flowchart of a backlight unit driving step of FIG. 9.

FIG. 9 is a flowchart showing a schematic driving method of a liquid crystal display according to a fourth exemplary embodiment of the present invention. FIG. 10 is a detailed flowchart of a backlight unit driving step of FIG. 9.

The driving method of the liquid crystal display according to the fourth exemplary embodiment of the present invention will be described with reference to FIGS. 4 to 8 along with FIGS. 9 and 10.

The driving method of the liquid crystal display according to the fourth exemplary embodiment of the present invention comprises a DC power source driving step S110, a backlight unit driving step S120, and a liquid crystal panel driving step S130.

The DC power source driving step S110 is a step of driving the DC power source 120 to convert a first DC power voltage supplied from an external source into a second DC power voltage and supply it to the backlight unit BLU. In this step, DC power is supplied to the anodes of the light emitting sources RS1 and RSm of the backlight unit BLU.

The backlight unit driving step S120 is a step of driving the transistors T1 and Tm for driving the backlight unit BLU to emit light from the backlight unit BLU. In this step, the transistors T1 and Tm of the backlight unit driver BRDV are driven by the driving signal output from LED driver 130. Also, the DC power supplied to the anodes of LED strings RS1 and RSm flows through the collector electrodes and emitter electrodes of the transistors T1 and Tm. Then, the LED strings RS1 and RSm emit light.

The liquid crystal panel driving step S130 is a step of displaying an image on the liquid crystal panel using the light emitted from the backlight unit BLU. In this step, the liquid crystal panel receives gate signals and data signals, and therefore the liquid crystal layer included in the corresponding sub-pixels is driven. Also, the liquid crystal panel displays an image by the emitted light depending on the driving state of the liquid crystal layer.

Meanwhile, in the backlight unit driving step S120 of the process in which the liquid crystal display is driven to display an image as described above, a driving operation as shown in FIG. 10 is conducted.

First, a transistor is driven while the base electrode of the transistor is monitored (S121).

Next, it is determined whether the voltage of the base electrode of the transistor drops below a reference voltage (S123).

Next, if the voltage of the base electrode of the transistor does not drop below the reference voltage (N), an LED driver for driving the transistor is driven (S125). On the other hand, if the voltage of the base electrode of the transistor drops below the reference voltage (Y), the LED driver for driving the transistor is stopped. At the same time, the DC power source 120 is optionally stopped (S129).

In the above-described backlight unit driving step (S120), the base electrode of the transistor is monitored using a sensing resistor connected in series with the base electrode of the transistor, and if the voltage of the base electrode of the transistor drops below the reference voltage (Y), an LED included in the backlight unit BLU is detected as being shorted, and therefore the LED driver is stopped.

The above-described driving condition may be applied, but not limited, to the backlight unit drivers BDRV of the first to third exemplary embodiments.

As seen above, the present invention provides a liquid crystal display, which drives a transistor for driving an LED string by two pins for each channel, and comprises a backlight unit driver having an LED driver for sensing and detecting the presence or absence of an LED short in an LED string connected to the corresponding channel to protect the related devices, and a driving method thereof. Moreover, the present invention can achieve cost reduction by a decrease in the number of pins in a device configuration because the LED driver included in the backlight unit driver consists of two pins for each channel. Further, the present invention can prevent overcurrent and lower power consumption because the LED driver and the DC power source can be optionally stopped in the event of LED short.

The foregoing embodiments and advantages are merely exemplary and are not to be construed as limiting this document. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A liquid crystal display comprising:
a liquid crystal panel;
LED strings connected to an output terminal of a DC power source and providing light to the liquid crystal panel;
transistors whose collector electrodes are connected to cathodes of LEDs positioned at the lowermost stages of the LED strings, and whose emitter electrodes are connected to the monitor resistors; and
an LED driver which has first pins respectively connected to base electrodes of the transistors to supply driving signals and second pins connected between the emitter electrodes of the transistors and monitor resistors,
wherein the first pins sense voltages of the base electrodes of the transistors to detect a short in the LEDs,
wherein the LED driver comprises driving signal supply portions for supplying the driving signal and short sensing portions for detecting the presence or absence of a short in the LEDs, and
wherein the short sensing portions receive a sensing voltage from the base electrodes of the transistors, respectively, through sensing resistors respectively formed between output terminals of the driving signal supply portions and the base electrodes of the transistors, and detect the presence or absence of a short in the LEDs included in the corresponding LED string based on the sensing voltage.

2. The liquid crystal display of claim 1, wherein the short sensing portions detect the presence or absence of a short in the LEDs included in the corresponding LED string by using a difference between the sensing voltage and a reference voltage.

3. The liquid crystal display of claim 2, wherein the short sensing portions comprise comparators whose inverting terminal is connected to the output terminals of the driving signals supply portions, and whose non-inverting terminals is connected to a reference voltage terminal supplying the reference voltage.

4. The liquid crystal display of claim 1, wherein the short sensing portions detect the presence or absence of a short in the LEDs included in the corresponding LED string by using a difference between an (N−1)-th sensing voltage supplied from an (N−1)-th first pin and an N-th sensing voltage supplied from an N-th first pin, wherein N is an integer more than 1.

5. The liquid crystal display of claim 4, wherein the short sensing portions comprise,
a first comparator whose inverting terminal is connected to an output terminal of an (N−1)-th driving signal supply portion supplying a driving signal to the (N−1)-th first pin, and whose non-inverting terminal is connected to an output terminal of an N-th driving signal supply portion supplying a driving signal to the N-th first pin; and
a second comparator whose inverting terminal is connected to an output terminal of an N-th driving signal supply portion supplying a driving signal to the N-th first pin, and whose non-inverting terminal is connected to an output terminal of an (N−1)-th driving signal supply portion supplying a driving signal to the (N−1)-th first pin.

6. The liquid crystal display of claim 1, wherein one of the short sensing portions detects a short in the LEDs included in the corresponding LED string by using a difference between an (N−1)-th sensing voltage supplied from (N−1)-th first pin and a reference voltage,
wherein the other one of the short sensing portions detects a short in the LEDs included in the corresponding LED string by using a difference between an (N−1)-th sensing voltage supplied from an (N−1)-th first pin and an N-th sensing voltage supplied from an N-th first pin,
wherein N is an integer more than 1.

7. The liquid crystal display of claim 6, wherein the short sensing portions comprise,
a first comparator whose inverting terminal is connected to an output terminal of an (N−1)-th driving signal supply portion supplying a driving signal to the (N−1)-th first pin, and whose non-inverting terminal is connected to a reference voltage terminal supplying the reference voltage; and
a second comparator whose inverting terminal is connected to an output terminal of an N-th driving signal supply portion supplying a driving signal to the N-th first pin, and whose non-inverting terminal is connected to an output terminal of an (N−1)-th driving signal supply portion supplying a driving signal to the (N−1)-th first pin.

8. The liquid crystal display of claim 1, wherein the sensing resistors are formed inside the LED driver so as to be respectively positioned between the output terminals of the driving signal supply portions and the first pins.

9. The liquid crystal display of claim 1, wherein the sensing resistors are formed outside the LED driver so as to be respectively positioned between the first pins and the base electrodes of the transistors.

10. The liquid crystal display of claim 1, wherein, if a short occurs in an LED, the LED driver disables the LED string with the short or disables all of the LED strings.

11. The liquid crystal display of claim 1, wherein, if a short occurs in an LED, the LED driver stops the output of the DC power source.

12. A driving method of a liquid crystal display, the method comprising:
driving a DC power source to boost a first DC power voltage supplied from an external source into a second DC power voltage and supply the same to a backlight unit;
driving a transistor for driving the backlight unit to emit light from the backlight unit; and
displaying an image on a liquid crystal panel using the light emitted from the backlight unit,
wherein, in the step of driving the DC power source, a base electrode of the transistor is monitored, and if a voltage of the base electrode of the transistor drops below a reference voltage, an LED driver driving the transistor is stopped,
wherein, in the backlight unit driving step, the base electrode of the transistor is monitored using a sensing resistor connected in series with the base electrode of the transistor, and if the voltage of the base electrode of the transistor drops below the reference voltage, an LED included in the backlight unit is detected as being shorted, and therefore the LED driver is stopped.

* * * * *